United States Patent
Hu et al.

(10) Patent No.: US 9,103,949 B2
(45) Date of Patent: Aug. 11, 2015

(54) DIRECT-LIGHT BACKLIGHT MODULE WITH ASSISTING SOLAR LIGHT AND LIQUID CRYSTAL DISPLAY DEVICE

(71) Applicant: Shenzhen China Star Optoelectronics Technology Co., Ltd., Shenzhen, Guangdong (CN)

(72) Inventors: Che-Chang Hu, Shenzhen (CN); Hu He, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 391 days.

(21) Appl. No.: 13/806,984

(22) PCT Filed: Nov. 15, 2012

(86) PCT No.: PCT/CN2012/084705
§ 371 (c)(1),
(2) Date: Dec. 26, 2012

(87) PCT Pub. No.: WO2014/071646
PCT Pub. Date: May 15, 2014

(65) Prior Publication Data
US 2014/0132881 A1    May 15, 2014

(30) Foreign Application Priority Data
Nov. 12, 2012   (CN) ........................ 2012 1 0448482

(51) Int. Cl.
*G02F 1/133* (2006.01)
*F21V 8/00* (2006.01)
*G02F 1/1335* (2006.01)

(52) U.S. Cl.
CPC ........ *G02B 6/0006* (2013.01); *G02F 1/133602* (2013.01); *G02B 6/0008* (2013.01); *G02B 6/0068* (2013.01); *G02F 2001/133618* (2013.01)

(58) Field of Classification Search
CPC .............. G02F 1/133605; G02F 2001/133618; G02F 1/133602; G02B 6/0006; G02B 6/0068; G02B 6/0008
USPC ................................................. 349/61, 62, 68
See application file for complete search history.

(56) References Cited

U.S. PATENT DOCUMENTS

| | | | |
|---|---|---|---|
| 5,121,232 A * | 6/1992 | Miyadera | 349/68 |
| 7,213,955 B1 * | 5/2007 | Ladouceur et al. | 362/557 |

* cited by examiner

*Primary Examiner* — James Dudek
(74) *Attorney, Agent, or Firm* — Andrew C. Cheng

(57) ABSTRACT

The present invention provides a direct light backlight module with solar light assistance, which comprises a backboard. The backboard is provided with a waveguide. A light source is disposed under the waveguide. An optical film module is disposed above the waveguide and faces the light emitted from the direct light source. An assisting light source device is provided and which collects solar light and direct it to an optical film module. The present invention further provides a liquid crystal display device with the direct light backlight module with assisting solar light. With the provision of the assisting light source, the solar light can be used as an assisting light source making the backlight module and the liquid crystal display device made therefrom become more environmental friendly.

14 Claims, 1 Drawing Sheet

DIRECT-LIGHT BACKLIGHT MODULE WITH ASSISTING SOLAR LIGHT AND LIQUID CRYSTAL DISPLAY DEVICE

CROSS REFERENCE

This application is claiming a priority arisen from a patent application, entitled with "Direct-Light Backlight Module with Assisting Solar Light and Liquid Crystal Display Device", submitted to China Patent Office on Nov. 12, 2012, designated with an Application No. 201210448482.8. The whole and complete disclosure of such patent application is hereby incorporated by reference.

FIELD OF THE INVENTION

The present invention relates to a thin film transistor liquid crystal display, also known as TFT-LCD, and more particular to a direct light backlight module with assisting solar light source and also a liquid crystal display made with such a backlight module.

Currently, the light source used in a backlight module of a TFT-LCD is typically an LED (light emitting diode) for which is featured with energy saving and comparably high performance.

As shown in FIG. 1, which is an illustrational and structural view of a backlight module, and which includes a backboard 1, a printed circuit board 2 and a waveguide 3 both mounted onto the printed circuit board 1. The waveguide 3 is arranged with a plurality of direct light source 4, which is made from LED interconnected to the waveguide 3 and the printed circuit board 2. The light beam from the light source 4 is projected to an optical film module 5.

With the energy saving has become more and more commanding, the TFT-LCD is also requested to join the energy saving pool. One of the measurements is to reduce the number of the LED used in the backlight module. Currently, a so-called second lens technology has been introduced, and with the second lens, the projected profile of the light beam from the LED is modified so as to reduce the fusion area of the LED. With the technology, the number of LED used can be reduced. However, if the energy saving is pushed further, then the so-called second lens technology will also meet a dead end.

SUMMARY OF THE INVENTION

It is the objective of the present invention to provide a direct light backlight module with assisting solar light source and a liquid crystal display device incorporated with such as backlight module, and in which solar light can be used as an assistant light source such that the LCD made therefrom can save more energy and environmental friendly.

In order to resolve the above described prior art issue, the present invention provides a direct light backlight module with solar light assistance, which comprises the following elements.

A backboard is provided.
The backboard is provided with a waveguide.
A light source is disposed under the waveguide.
An optical film module is disposed above the waveguide and faces the light emitted from the direct light source.
An assisting light source device is provided and which collects solar light and direct it to an optical film module.
The assisting light source device further includes the following elements.

An optical connector is arranged onto the backlight module, and which is used to couple to an external solar light collecting device.

A plurality of fiber optics is coupled to the optical connector for transmitting solar light.

Each fiber optic has an output facing to the optical film module.

Wherein each of the output of the fiber optic is securely positioned onto the waveguide.

Wherein on the waveguide, the LED of the direct light source and the output of the assisting light source device are alternatively arranged.

Wherein the optical connector is a coupler mounted on the backboard of the backlight module.

Wherein the backlight module further comprises a switching device selecting one of the side light source or the assisting solar light source as working light source, or both as the working light sources.

Correspondingly, the present invention further provides a liquid crystal display device incorporated with a direct light backlight module with assisting solar light source. The liquid crystal display device includes at least the following elements.

A backboard is provided.
The backboard is provided with a waveguide.
A light source is disposed under the waveguide.
An optical film module is disposed above the waveguide and faces the light emitted from the direct light source.
An assisting light source device is provided and which collects solar light and direct it to an optical film module.
The assisting light source device further includes the following elements.

An optical connector is arranged onto the backlight module, and which is used to couple to an external solar light collecting device A plurality of fiber optics is coupled to the optical connector for transmitting solar light.

Each fiber optic has an output facing to the optical film module.

Wherein each of the output of the fiber optics is securely positioned onto the waveguide.

Wherein on the waveguide, the LED of the direct light source and the output of the assisting light source device are alternatively arranged.

Wherein the optical connector is a coupler mounted on the backboard of the backlight module.

Wherein the backlight module further comprises a switching device selecting one of the side light source or the assisting solar light source as working light source, or both as the working light sources.

The present invention can be concluded with the following advantages.

With the implementation of an assisting solar light source into the present invention, the solar light can be served as an assisting light source benefiting the brightness of the backlight module such that during the daytime, the solar light can be used as a light source; while in the cloudy and nighttime, the LED light source can be used as the main light source. Accordingly, the overall power of the LED can be reduced so as to meet the standard of the environmental friendly.

By providing an optical connector on the backlight module, it is readily convenient for the backlight module to collect the solar light source during the daytime. The collected solar light can be readily served as the assisting light source.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings.

DETAILED DESCRIPTION OF PREFERRED EMBODIMENT

Detailed description will be given in view of preferred embodiments made in accordance with the present invention.

Figure 1:
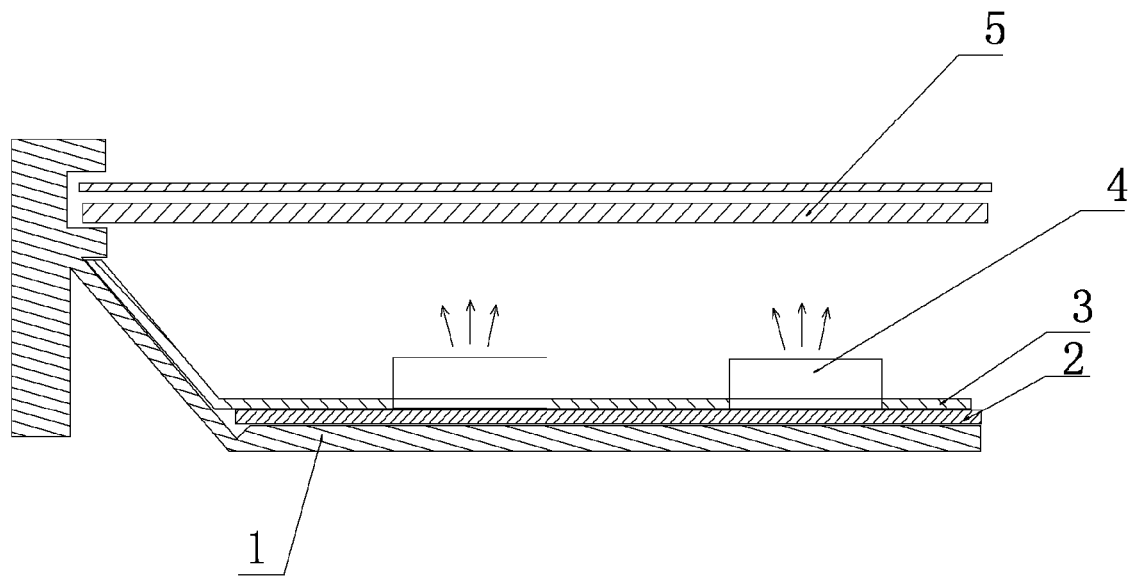
FIG. 1 is an illustrational and structural view of a prior art backlight module with direct light source.
Figure 2:
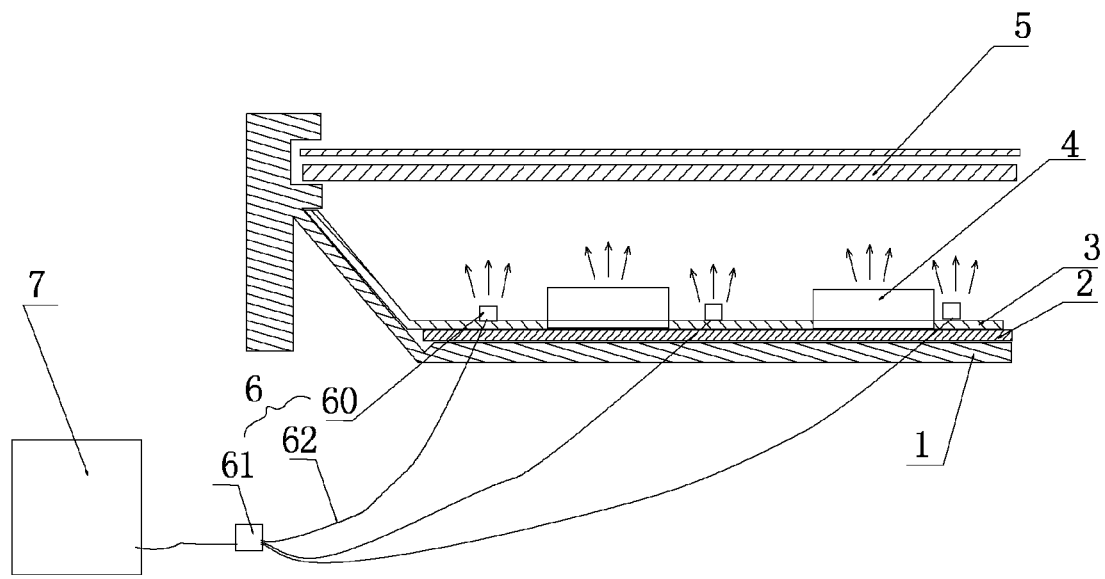
FIG. 2 is an illustrational view of a backlight module made in accordance with the present invention.

Referring to FIG. 2, which is an illustrational view of a backlight module made in accordance with the present invention. The direct light backlight module with assisting solar light source includes at least the following elements.

A backboard 1 is provided.

The backboard 1 is provided with a printed circuit board 2 and a waveguide 3.

A backlight module 4 is disposed on the waveguide 4, and configured with a plurality of LED and is connected to the printed circuit board 2 through the waveguide 3.

An optical film module 5 is disposed above the waveguide 3 while facing the emitted light from the light source 4. The optical film module 5 includes a plurality of optical films, such as a diffuser or a prism. By this arrangement, the brightness of the light beam emitted from the emitting surface of the waveguide is bright and homogeneous which can readily illuminate a liquid crystal display panel.

The backlight module further includes the following elements.

An assisting light source 6 is used to collect solar light and then direct the solar light to the optical film module 5.

The assisting light source 6 further includes the following parts.

An optical connector 61 is arranged onto the backlight module, and which is used to intercouple with a collector 7. Substantially, the optical connector 61 is a fiber optic coupler mounted onto the backboard 1 of the backlight module. The collector 7 can be intercoupled to the optical connector 61 by means of fiber optics. Accordingly, the collected light can be readily and effectively transmitted to the optical connector 61. The collector 6 is configured with at least a solar panel to collect the solar light, and further transmitted by means of the fiber optics. With the fiber optics, the collector 7 and the backlight module can be kept with a proper distance so as to collect solar light.

A plurality of fiber optics 22 is coupled to the optical connector 61, and which are used to transmit collected solar light by the collector 7.

An output 60 of each of the fiber optics 62 is directed to the optical film 5.

Wherein each of the outputs 60 is securely attached to the waveguide 3, and the output 60 of the assisting light source 6 are alternatively arranged with the LED of the light source 4.

The backlight module further includes a switching device (not shown in Figure). The switching device can be used to switch the working light source to one of the direct light source or the assisting light source or selecting both of them as the working light sources. For example, during the daytime, the assisting light source 6 can be selected, while in the cloudy day or the nighttime, both the direct light source 4 is selected.

The present invention further includes a liquid crystal display device incorporated with the backlight module shown in FIG. 2.

The present invention can be concluded with the following advantages.

With the implementation of an assisting solar light source into the present invention, the solar light can be served as an assisting light source benefiting the brightness of the backlight module such that during the daytime, the solar light can be used as a light source; while in the cloudy and nighttime, the LED light source can be used as the main light source. Accordingly, the overall power of the LED can be reduced so as to meet the standard of the environmental friendly.

By providing an optical connector on the backlight module, it is readily conveniently to couple the backlight module with an external solar collector and the collected solar light can be readily used to boost the illumination of the backlight module as an additional light source.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A direct light backlight module with solar light assistance, including
   a backboard;
   a waveguide arranged on the backboard;
   a direct light source comprising a plurality of light-emitting elements substantially uniformly distributed on the waveguide;
   an optical film module disposed above the waveguide and having an incidental surface facing the plurality of light-emitting elements to directly receive light emitted from the light-emitting elements of the direct light source; and
   an assisting light source device, which is adapted to collect solar light and comprises a plurality of fiber optics each having a light emitting end serving as an output of solar light mounted to the waveguide to directly face the incidental surface of the optical film module and directly project the solar light to the incidental surface of the optical film module.

2. The direct light backlight module with assisting solar light source as recited in claim 1, wherein the assisting light source device further comprises a solar light collector that collects solar light and an optical connector disposed onto the backlight module for intercoupling to the solar light collector; and the plurality of fiber optics is intercoupled to the optical connector for transmitting solar light from the solar light collector to the outputs thereof.

3. The direct light backlight module with assisting solar light source as recited in claim 2, wherein the light-emitting elements of the direct light source and the outputs of the fiber optics of the assisting light source device are alternately arranged on the waveguide to directly face the incidental surface of the optical film module.

4. The direct light backlight module with assisting solar light source as recited in claim 3, wherein the optical connector is a coupler mounted on the backboard of the backlight module.

5. The direct light backlight module with assisting solar light source as recited in claim 1, wherein the backlight module further comprises a switching device selecting one of the direct light source and the assisting solar light source device as a working light source, or both as the working light sources.

6. A direct light backlight module with solar light assistance, including
a backboard;
a waveguide arranged on the backboard;
a direct light source comprising a plurality of light-emitting elements substantially uniformly distributed on the waveguide;
an optical film module disposed above the waveguide and having an incidental surface facing the plurality of light-emitting elements to directly receive light emitted from the light-emitting elements of the direct light source; and
an assisting light source device, which comprises a solar light collector that is adapted to collect solar light; an optical connector disposed onto the backlight module for intercoupling to the solar light collector; and a plurality of fiber optics intercoupled to the optical connector for transmitting solar light from the solar light collector to a light emitting end thereof that serves as an output of solar light; wherein the outputs of the fiber optics are mounted to the waveguide to directly face an incidental surface of the optical film module and to directly project the solar light to the incident surface of the optical film module.

7. The direct light backlight module with assisting solar light source as recited in claim 6, wherein the light-emitting elements of the direct light source and the outputs of the fiber optics of the assisting light source device are alternately arranged on the waveguide to directly face the incidental surface of the optical film module.

8. The direct light backlight module with assisting solar light source as recited in claim 7, wherein the optical connector is a coupler mounted on the backboard of the backlight module.

9. The direct light backlight module with assisting solar light source as recited in claim 6, wherein the backlight module further comprises a switching device selecting one of the direct light source and the assisting solar light source device as a working light source, or both as the working light sources.

10. A liquid crystal display device incorporated with a direct light backlight module with solar light assistance, including
a backboard;
a waveguide arranged on the backboard;
a direct light source comprising a plurality of light-emitting elements substantially uniformly distributed on the waveguide;
an optical film module disposed above the waveguide and having an incidental surface facing the plurality of light-emitting elements to directly receive light emitted from the light-emitting elements of the direct light source; and
an assisting light source device, which is adapted to collect solar light and comprises a plurality of fiber optics each having a light emitting end serving as an output of solar light mounted to the waveguide to directly face the incidental surface of the optical film module and directly project the solar light to the incidental surface of the optical film module.

11. The liquid crystal display device as recited in claim 10, wherein the assisting light source device further comprises an optical connector that is arranged onto the backlight module and is used to couple to an external solar light collecting device, wherein the plurality of fiber optics is coupled to the optical connector for transmitting solar light from the external solar light collecting device to the outputs thereof.

12. The liquid crystal display device as recited in claim 11, wherein the light-emitting elements of the direct light source and the outputs of the fiber optics of the assisting light source device are alternately arranged on the waveguide to directly face the incidental surface of the optical film module.

13. The liquid crystal display device as recited in claim 12, wherein the optical connector is a coupler mounted on the backboard of the backlight module.

14. The liquid crystal display device as recited in claim 10, wherein the backlight module further comprises a switching device selecting one of the direct light source and the assisting solar light source device as a working light source, or both as the working light sources.

* * * * *